US011766775B2

(12) United States Patent
Shen et al.

(10) Patent No.: US 11,766,775 B2
(45) Date of Patent: Sep. 26, 2023

(54) METHOD, DEVICE AND COMPUTER-READABLE STORAGE MEDIUM FOR DESIGNING SERIAL MANIPULATOR

(71) Applicant: UBKang (Qingdao) Technology Co., Ltd., Qingdao (CN)

(72) Inventors: Yang Shen, Los Angeles, CA (US); Dejun Guo, San Gabriel, CA (US); ChengKun Zhang, Pasadena, CA (US); Huan Tan, Pasadena, CA (US)

(73) Assignee: UBKang (Qingdao) Technology Co., Ltd., Qingdao (CN)

( * ) Notice: Subject to any disclaimer, the term of this patent is extended or adjusted under 35 U.S.C. 154(b) by 236 days.

(21) Appl. No.: 17/325,221

(22) Filed: May 20, 2021

(65) Prior Publication Data
US 2022/0371187 A1 Nov. 24, 2022

(51) Int. Cl.
B25J 9/16 (2006.01)

(52) U.S. Cl.
CPC ........... *B25J 9/1605* (2013.01); *B25J 9/1607* (2013.01); *B25J 9/1633* (2013.01); *B25J 9/1666* (2013.01)

(58) Field of Classification Search
CPC ...... B25J 9/1605; B25J 9/1607; B25J 9/1633; B25J 9/1666; B25J 9/02; B25J 9/1638; B25J 9/1643; B25J 9/1651; B25J 9/1664; B25J 9/1656; B25J 9/1674; B25J 9/1676; B25J 18/06; B25J 9/00; G05B 2219/39062; G05B 2219/40527; G05B 9/03; G05B 13/041; G05B 17/00
See application file for complete search history.

(56) References Cited

U.S. PATENT DOCUMENTS

| 11,096,753 | B1 * | 8/2021 | Mantri | A61B 34/32 |
| 11,583,348 | B2 * | 2/2023 | Fukushima | A61B 90/361 |
| 2019/0134821 | A1 * | 5/2019 | Patrick | B25J 9/06 |

FOREIGN PATENT DOCUMENTS

CN 109048927 12/2018

OTHER PUBLICATIONS

Redwan M. Alqasemi, Maximizing Manipulation Capabilities of Persons with Disabilities Using a Smart 9-Degree-of-Freedom Wheelchair-Mounted Robotic Arm System, Mar. 29, 2007 (Year: 2007).*
ISR for PCT/CN2022/084241.
Written opinions of ISA for PCT/CN2022/084241.

* cited by examiner

*Primary Examiner* — Jonathan L Sample
*Assistant Examiner* — Byron Xavier Kasper (57) ABSTRACT

A design method of serial manipulator that comprises an end effector, a number of random-access links, and a number of motors, includes: obtaining a desired motion profile of the end effector; discretizing the desired motion profile into a plurality of points, wherein each of the points carries information of speed, acceleration, and force/torque of the end effector at the point; determining the number of degrees of freedom of the serial manipulator, and initializing the length of each of the links and the motor type of each of the motors; and at each of the points, optimizing the initialized lengths of the links and the motor types of the motors by calculating a dynamic manipulability ellipsoid at the end effector, to obtain desired lengths of the links and desired motor types of the motors, which allows the end effector to execute the desired motion profile under predetermined constraints.

20 Claims, 9 Drawing Sheets

METHOD, DEVICE AND COMPUTER-READABLE STORAGE MEDIUM FOR DESIGNING SERIAL MANIPULATOR

TECHNICAL FIELD

The present disclosure generally relates to manipulators, and particularly to a method, device, and computer-readable storage medium for design a serial manipulator.

BACKGROUND

Conventional serial robotic manipulators are typically equipped with large and strong motors to enable high payload capability. Due to the limit of power-to-mass ratio, within a budget, motors with larger torque output usually come with heavier self-weight and thus add burden to overcome. A compact manipulator with small footprint is required in certain application environments. The trade-off between high torque output and compact design leads to the need for a better design process.

Additionally, for many industrial robotic manipulators, only downward payloads are heterogeneously considered in the manipulator's reachable workspace. In other words, in some configurations with non-downward payloads, the end effector could have saved torque output capabilities by downgrading the motors in use, or by modifying the mechanism design.

Therefore, there is a need to provide a serial manipulator design method to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 1:
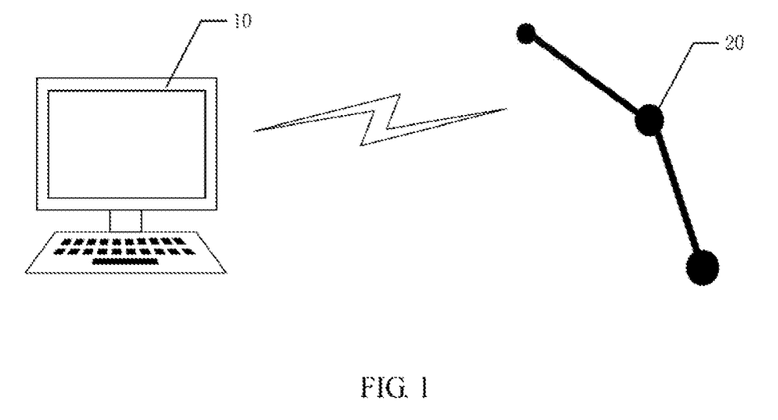
FIG. 1 is a schematic diagram of an application scenario according to one embodiment of the present disclosure.
Figure 2:
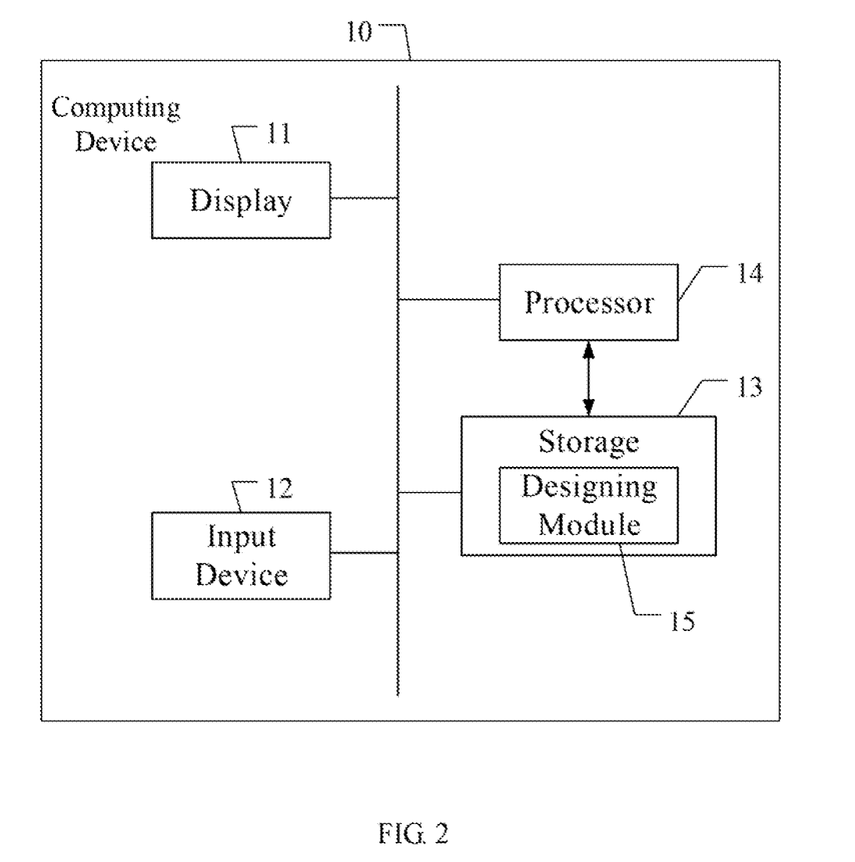
FIG. 2 is a schematic block diagram of a computing device according to one embodiment of the present disclosure.

FIG. 1 is a schematic diagram of an application scenario according to an embodiment. As shown in FIG. 1, a computing device 10 is wiredly or wirelessly connected to a manipulator 20. The computing device 10 can be configured to design the manipulator 20 and control the manipulator 20 so as to test the designed manipulator 20. Referring to FIG. 2, in one embodiment, the computing device 10 may include a display 11, an input device 12, a storage 13 and a processor 14. The storage 13 includes a non-transitory computer-readable storage medium, and stores computer programs (e.g., designing module 15) executable by the processor 14. The processor 14 is electrically coupled to the storage 13, and by calling the computer programs stored in the storage 13, the computer-implemented design method of the serial manipulator provided in the embodiments of the present disclosure is implemented. The computing device 10 may be a device with computing and control functions, such as a desktop computer, a tablet computer, and a laptop computer.

The display 11 displays the motion profile of the manipulator 20. The input device 12 receives design data inputted by a user, where the design data may include the lengths of the links and the motor types of the motors of the manipulator 20. The manipulator 20 may include multiple joints such as a shoulder joint, an elbow joint, and a wrist joint. Each joint is provided with a motor, and the motion of each joint is driven by the motor. In the embodiment, the wrist joint is the end effector of the manipulator 20.

Figure 3:
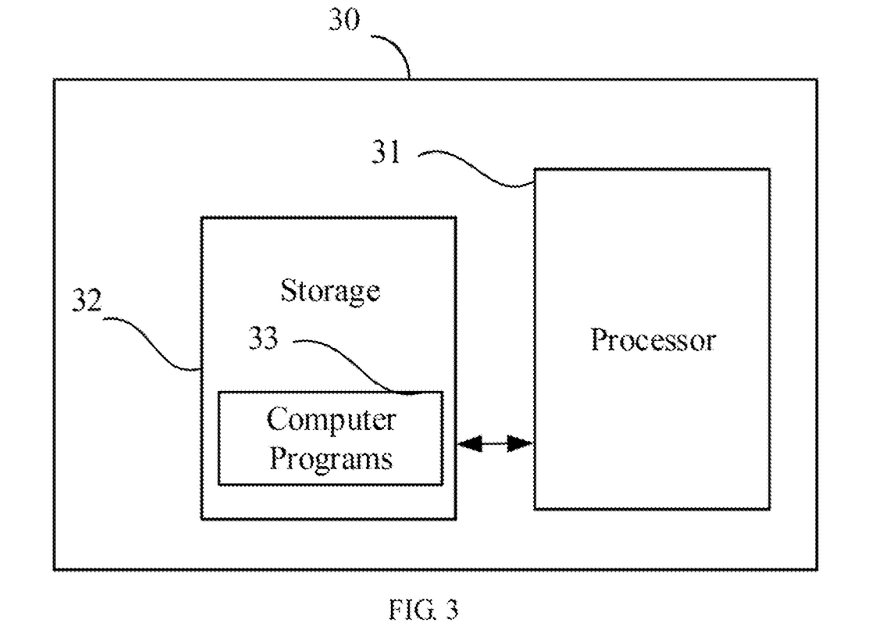
FIG. 3 is a schematic block diagram of a serial manipulator design device according to one embodiment of the present disclosure.
Figure 9:
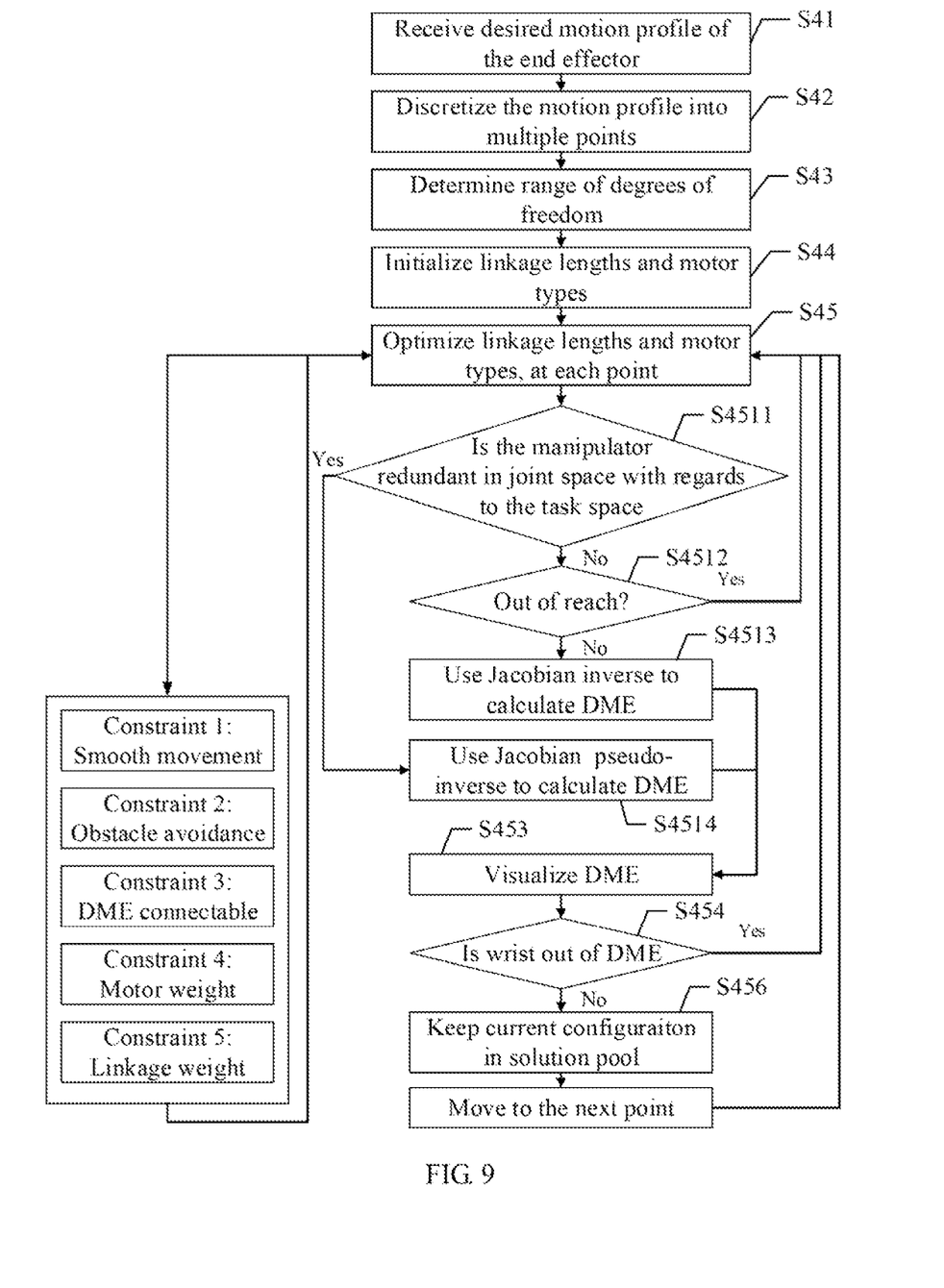
FIG. 9 is a schematic diagram of a complete flowchart of the computer-implemented serial manipulator design method according to one embodiment of the present disclosure.

Referring to FIG. 3, in one embodiment, a serial manipulator design device 30 may include processor 31, a storage 32, and one or more computer programs 33 stored in the storage 32 and executable by the processor 31. When the processor 31 executes the computer programs 33, the steps in the embodiments of the method for designing a manipulator, such as steps S41 to S45 in FIG. 4, steps S451 through S456 in FIG. 5, steps S4511 through S4514 in FIG. 6, and steps in FIG. 9, are implemented.

The processor 31 may be a central processing unit (CPU), a general-purpose processor, a digital signal processor (DSP), an application-specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 32 may be an internal storage unit of the device 30, such as a hard disk or a memory. The storage 32 may also be an external storage device of the device 30, such as a plug-in hard disk, a smart memory card (SMC), and a secure digital (SD) card, or any suitable flash cards. Furthermore, the storage 32 may also include both an internal storage unit and an external storage device. The storage 32 is used to store computer programs, other programs, and data required by the device 30. The storage 32 can also be used to temporarily store data that have been output or is about to be output.

Exemplarily, the one or more computer programs 33 may be divided into one or more modules/units, and the one or more modules/units are stored in the storage 32 and executable by the processor 31. The one or more modules/units may be a series of computer program instruction segments capable of performing specific functions, and the instruction segments are used to describe the execution process of one or more computer programs 33. The one or more computer programs 33 include computer-executable instructions for performing one or more functions described below and the methods described in this disclosure (e.g., the computer-implemented serial manipulator design method and other methods described herein). These sets of instructions need not be implemented as separate software programs, procedures, or modules, and thus various subsets of these modules may be combined or otherwise rearranged in various embodiments. The device 30 may include components different in numbers from those illustrated, or incorporate some other different components. For example, the device 30 may further include an input and output device, a network access device, a bus, and the like.

Figure 4:
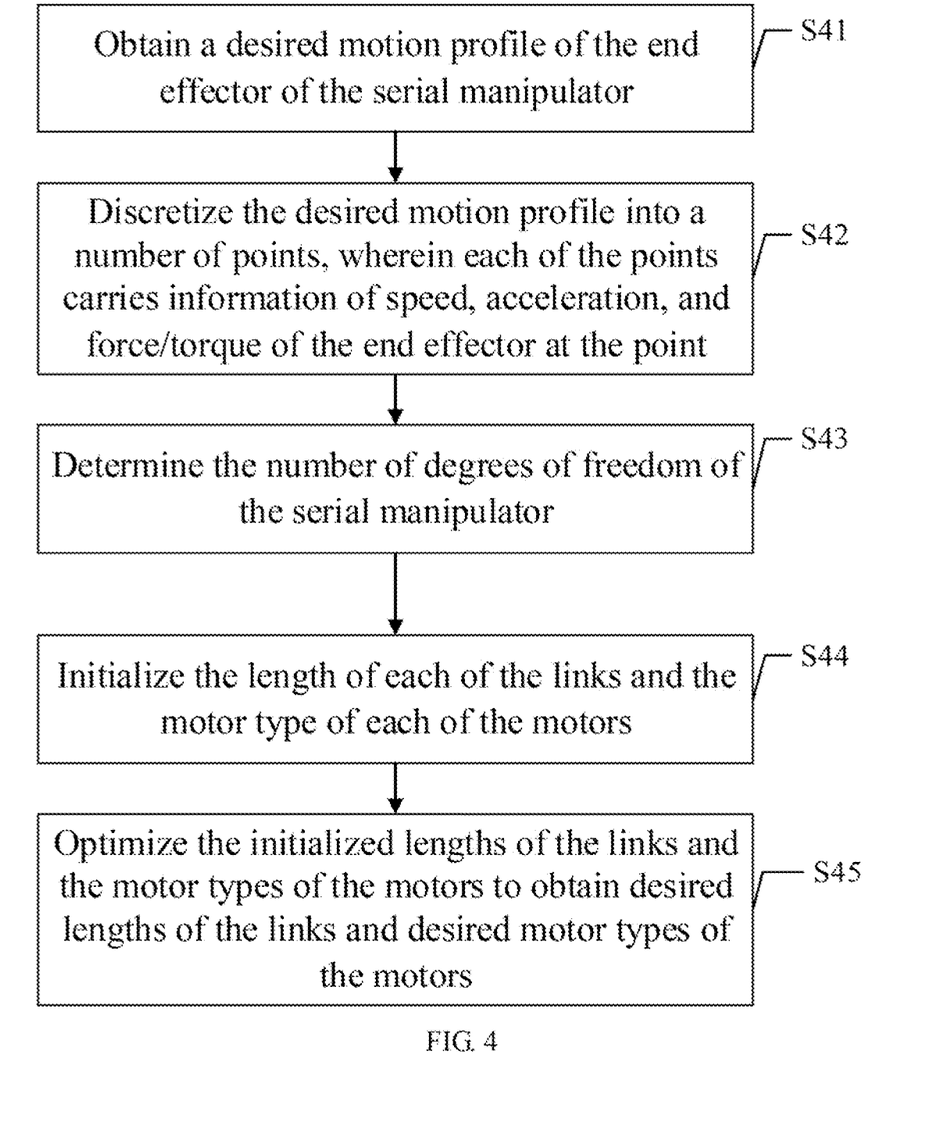
FIG. 4 is a schematic flowchart of a serial manipulator design method according to one embodiment of the present disclosure.

FIG. 4 shows a flowchart of a manipulator design method according to one embodiment. The method may be executed by one or more processors of the computing device 10 or one or more processors of the device 30. In one embodiment, the method may include steps S41 to S44.

Step S41: Obtaining a desired motion profile of the end effector of the serial manipulator 20.

One or more processors receive the desired motion profile inputted by a user. The desired motion profile is the basis for designing the serial manipulator, and the designed serial manipulator is required to execute the desired motion profile. The motion profile contains force/torque information. Here, force refers to the payload capacity of the manipulator, and torque refers to the output torque of each joint of the manipulator. The magnitude of the force and torque is determined by the motor of each joint that serves as a driving device and the lengths of the links between the joints. In the embodiment, the end effector is a wrist joint of the manipulator 20.

Step S42: Discretizing the desired motion profile into a number of points, wherein each of the points carries information of speed, acceleration, and force/torque of the end effector at the point.

In one embodiment, the distance between two adjacent points can be set to 3 millimeters. The desired motion profile can be equally divided into a number of points, or discretized into a number of points by a multi-order polynomial approximation method, which can make the curve formed by the discrete points smoother.

Step S43: Determining the number of degrees of freedom of the serial manipulator 20.

The number of degrees of freedom of the serial manipulator 20 is equal to the number of motors that control the rotation of the joints on the serial manipulator 20. In one embodiment, the number of degrees of freedom of the serial manipulator 20 lies in the range of 5 to 7.

Step S44: Initializing the length of each of the links and the motor type of each of the motors.

One or more processors receive initialized values of the length of each of the links and the motor type of each of the motors inputted by a user. The lengths of the links determine the weight of the links of the manipulator 20. The motor types determine the weight of the motors. The lengths of the links and the motor types of the motors determine the weight of the serial manipulator 20.

Step S45: Optimizing the initialized lengths of the links and the motor types of the motors to obtain desired lengths of the links and desired motor types of the motors, which allows the end effector to execute the desired motion profile under predetermined constraints.

In one embodiment, in the optimization process, in calculations that need to reduce the computational dimension, a gradient-based descent algorithm can be used to reduce the dimension. In another embodiment, the optimization may be made by loop exhaustion algorithm or random algorithm. Specifically, at each of the discrete points, the initialized lengths of the links and the motor types of the motors are optimized by calculating a dynamic manipulability ellipsoid (DME) of the end effector, to obtain desired lengths of the links and desired motor types of the motors, which allows the end effector to execute the desired motion profile under predetermined constraints.

The constraints include the requirements for the smoothness of the desired motion profile of the serial manipulator, the requirements for avoiding obstacles during the motion, and the requirements for the achievability of moving from one point of the motion profile to the next point. Specifically, the constraints may include: (a) the desired motion profile has a preset smoothness; (b) the serial manipulator needs to avoid obstacles; and (c) positions of the end effector in the dynamic manipulability ellipsoid at each of the points is able to be connected to one another to form the desired motion profile. The constraint (a) refers to that the error between the actual motion profile and the desired motion profile is less than the preset error value. For example, the distance between the two motion profiles is less than a preset distance. Obstacles in the constraint (b) refer to obstacles that need to be avoided in order to execute the motion profile. The constraint (c) refers to that the designed serial manipulator must be able to move from a discrete point to the next adjacent point. The designed serial manipulator must meet the constraints above.

In one embodiment, the constraints may further include the weight of the links and the weight of the motors of the serial manipulator. One objective of the manipulator design method is to design a serial manipulator that meets these constraints and can execute the desired motion profile.

Figure 5:
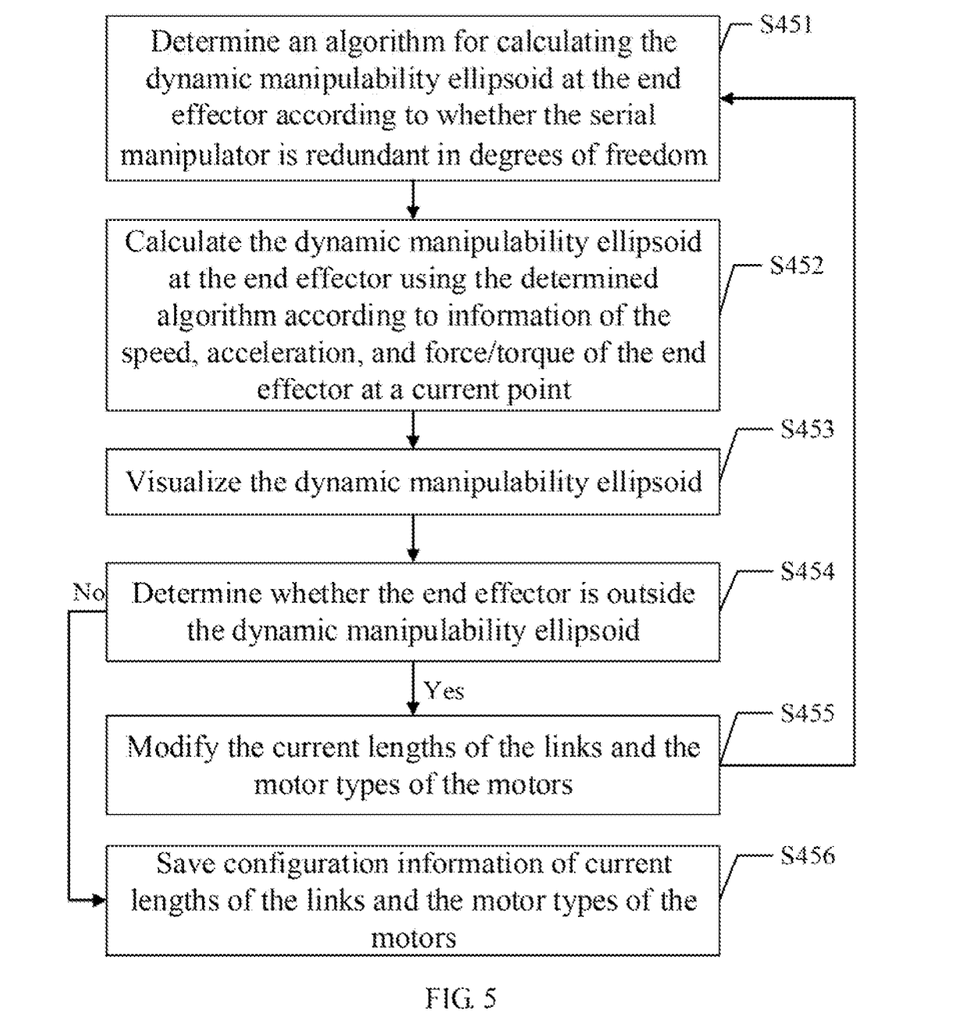
FIG. 5 is a schematic flowchart of a method for optimizing the lengths of the links and the motor type of the motors of the serial manipulator according to one embodiment of the present disclosure.

Referring to FIG. 5, in one embodiment, step S45 may include the following steps.

Step S451: Determining an algorithm for calculating the dynamic manipulability ellipsoid at the end effector according to whether the serial manipulator is redundant in degrees of freedom.

Step S452: Calculating the dynamic manipulability ellipsoid at the end effector according to information of the speed, acceleration, and force/torque of the end effector at a current point.

Step S453: Visualizing the dynamic manipulability ellipsoid.

In the embodiment, the visualized dynamic manipulability ellipsoid is displayed on a display.

Step S454: Determining whether the end effector is outside the dynamic manipulability ellipsoid.

A user can directly see on the display whether the end effector falls out of the dynamic manipulability ellipsoid. If the end effector is outside the dynamic manipulability ellipsoid, the procedure goes to step S455. If the end effector is within the dynamic manipulability ellipsoid, the procedure goes to step S455.

Step S455: Modifying the current lengths of the links and the motor types of the motors.

After modification, the procedure goes back to step S451.

Step S456: Saving configuration information of current lengths of the links and the motor types of the motors.

In the embodiment, the configuration information of current lengths of the links and the motor types of the motors are save as configuration information of the serial manipulator in a solution pool.

After step S456, the information of speed, acceleration, and force/torque of the end effector at the next point is obtained, and the lengths between the joints of the serial manipulator and the motor types of the motors at the next point are optimized. These steps are repeated until the lengths between the joints of the serial manipulator and the motor types of the motors at all the discrete points on the desired motion profile are optimized.

It should be noted that when optimizing the lengths between the joints of the serial manipulator and the motor types of the motors at a point except for the first point, the lengths of the links and motor types of the motors are selected from the optimization results corresponding to the previous point.

Figure 6:
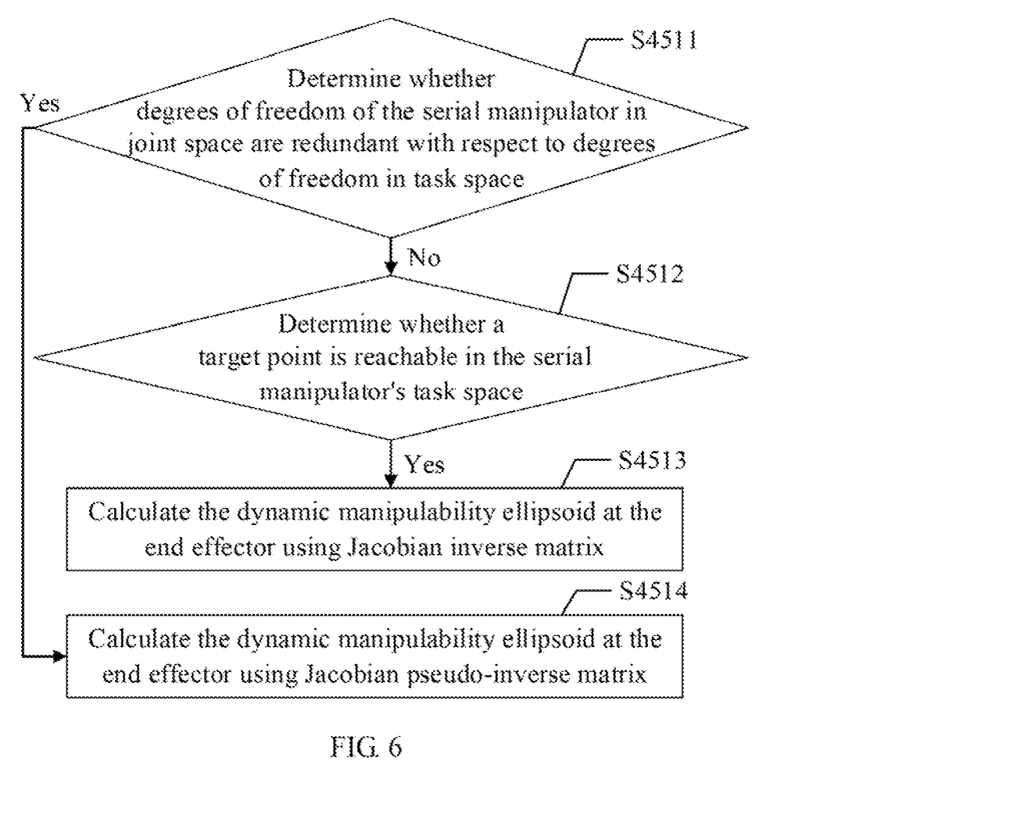
FIG. 6 is a schematic flowchart of a method for determining an algorithm for calculating the dynamic manipulability ellipsoid at the end effector according to one embodiment of the present disclosure.

Referring to FIG. 6, in one embodiment, step S451 may include the following steps.

Step S4511: Determining whether degrees of freedom of the serial manipulator in joint space are redundant with respect to degrees of freedom in task space.

If degrees of freedom of the serial manipulator in joint space are redundant with respect to degrees of freedom in task space, the procedure goes to step S4514. If degrees of freedom of the serial manipulator in joint space are not redundant with respect to degrees of freedom in task space, the procedure goes to step S4512.

For example, if the number of degrees of freedom of the serial manipulator in task space is equal to 6, it is determined that degrees of freedom of the serial manipulator in joint space are redundant with respect to degrees of freedom in task space when the number of degrees of freedom of the serial manipulator in joint space is greater than six. It is determined that degrees of freedom of the serial manipulator in joint space are not redundant with respect to degrees of freedom in task space when the number of degrees of freedom of the serial manipulator in joint space is equal to or less than six.

Step S4512: Determining whether a target point is reachable in the serial manipulator's task space.

This step is to determine whether the manipulator can reach a target point in the task space in case of non-redundant joints, that is, to determine whether the desired motion profile can be executed.

If the target point is not reachable in the serial manipulator's task space, the current lengths of the links and the motor types of the motors are modified. If the target point is reachable in the serial manipulator's task space, the procedure goes to step S4513.

Step S4513: Calculating the dynamic manipulability ellipsoid at the end effector using Jacobian inverse matrix.

Specifically, if the target point is reachable in the serial manipulator's task space, the speed and the acceleration of the end effector at the current point is set to 0, and the dynamic manipulability ellipsoid at the end effector is calculated using Jacobian inverse matrix according to the force/torque, the lengths of the links and the motor types of the motors at the current point.

Step S4514: Calculating the dynamic manipulability ellipsoid at the end effector using Jacobian pseudo-inverse matrix.

Specifically, if degrees of freedom of the serial manipulator in joint space are redundant with respect to degrees of freedom in task space, the speed and the acceleration of the end effector at the current point to 0, and the dynamic manipulability ellipsoid at the end effector is calculated using Jacobian pseudo-inverse matrix according to the force/torque, the lengths of the links and the motor types of the motors at the current point.

It should be noted that the weights of the links and the motor are taken into consideration during calculation of the dynamic manipulability ellipsoid. It is the easiest for the manipulator to exert force along the major axis of the ellipsoid, and it is the least easy for the manipulator to exert force along the minor axis of the dynamic manipulability ellipsoid. The relative positions of the center of the end effector inside the ellipsoid actually quantify this process. If the center of the end effector is very close to the upper surface of the ellipsoid, it means that this state is almost on the edge of collapse, which is unsafe. If the manipulator receives a little more load, it will fall down, and the center of the end effector will move out of the ellipsoid.

Figure 7:
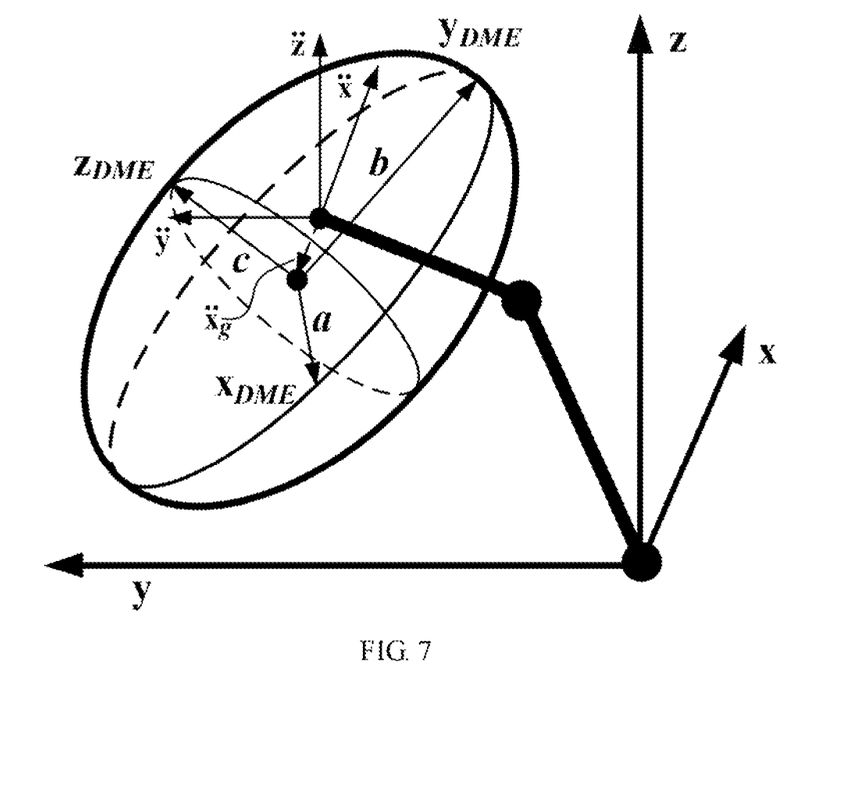
FIG. 7 is a schematic diagram of the dynamic manipulability ellipsoid of the present disclosure.

As shown in FIG. 7, the coordinate system x-y-z is a three-dimensional coordinate system established with the base (i.e., shoulder joint) of the manipulator as the origin, the coordinate system $\ddot{x}$-$\ddot{y}$-$\ddot{z}$ is a three-dimensional coordinate system established with one end (i.e., wrist joint) of the end effector of the manipulator as the origin, and $x_{DME}$-$y_{DME}$-$z_{DME}$ is a three-dimensional coordinate system established with the center of the dynamic manipulability ellipsoid as the origin.

Figure 8:
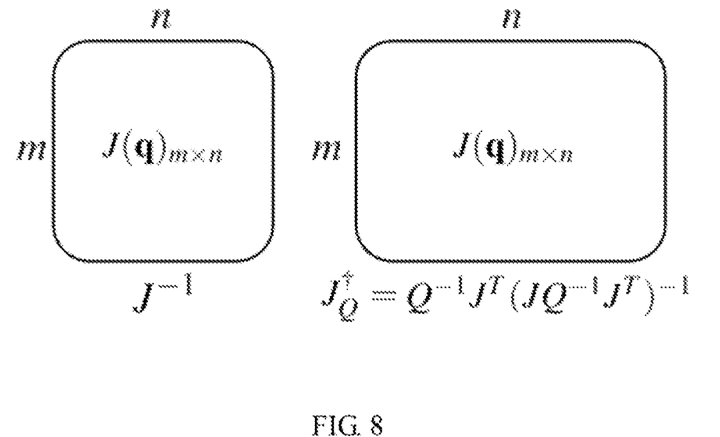
FIG. 8 is a diagram of the Jacobian inverse matrix and the Jacobian pseudo-inverse matrix for calculating the dynamic manipulator ellipsoid of FIG. 7.

As shown in FIG. 8, m represents the number of degrees of freedom in task space, and n represents the number of degrees of freedom in joint space. If m is equal to n, there is usually an inverse of the Jacobian matrix, and the solution is straightforward. In this case, the manipulator is non-redundant, and the Jacobian inverse matrix is a square matrix. If n is greater than m, the pseudo-inverse of the Jacobian matrix is required to establish a dynamically operable ellipsoid.

The calculation process is as follows. The conventional manipulability measure (MM) and its visualization—the manipulability ellipsoid (ME) have been modified and extended to versions like the "dynamic manipulability ellipsoid (DME)", the "manipulability force ellipsoid (MFE)" and the "manipulability velocity ellipsoid (MVE)". Considering the effect of loading as well as the relatively low manipulator moving speed during post-stroke upper limb rehabilitation training, a modified DME model is adopted, the derivation of which is provided as follows.

First, a serial (with actuators at each joint) manipulator's dynamics could be described as:

$$M(q)_{n \times n} \ddot{q}_{n \times 1} + c(q,\dot{q})_{n \times 1} + g(q)_{n \times 1} + J^T(q)_{n \times m} f_{m \times 1} = \tau_{n \times 1} \quad (1)$$

where the torque vectors $M(q)_{n \times n} \ddot{q}_{n \times 1}$, $c(q,\dot{q})_{n \times 1}$, and $g(q)_{n \times 1}$ are inertia, Coriolis/centrifugal, and gravity-related terms, respectively; $J^T(q)_{n \times m}$ is the transpose of Jacobian matrix linking end-effector force vector $f_{m \times 1}$ and joint torque vector $\tau_{n \times 1}$. $J(q)_{m \times n}$ also links joint space (n-DOF) velocity with task space (m-DOF) velocity:

$$\dot{x}_{m \times 1} = J(q)_{m \times n} \dot{q}_{n \times 1} \quad (2)$$

where $J(q)_{m \times n}$ represents linkage length and $\dot{q}_{n \times 1}$ represents angular speed. A non-redundant, unconstrained stationary assumption (m=n, $\dot{q}$=0, f=0) simplifies (1) to (3), and the time derivative of (2) to (4).

$$M\ddot{q}+g=\tau \quad (3)$$

$$\ddot{x}=J\ddot{q}=JM^{-1}\tau+\ddot{x}_g \quad (4)$$

where $\ddot{x}_g=-JM^{-1}g$, which represents the translation of ellipsoid center away from original end effector position. This translation has never been quantitatively analyzed or applied in previous related research, although it could help determine if an arm wrist is already out of the dynamic manipulability ellipsoid and if making gravity compensation necessary. Historically, for simplicity it is assumed that the manipulator's torque capability could be normalized using $\bar{\tau}=T^{-1}\tau$, $T=\text{diag}(\tau_{1,max}, \ldots, \tau_{n,max})$ as the scaling matrix and represented by a unit sphere (Euclidean norm) in joint space (5) and then a distorted/rotated ellipsoid could be calculated and visualized in task space (6), indicating the feasible acceleration directions and magnitudes.

$$\bar{\tau}^T\bar{\tau} \leq 1 \quad (5)$$

$$(\ddot{x}+JM^{-1}g)^T J^{-T} Q J^{-1} (\ddot{x}+JM^{-1}g) \leq 1 \quad (6)$$

$$\text{where: } Q=MT^{-2}M \quad (7)$$

Due to the redundancy, the dynamic manipulability ellipsoid (8) uses a weighted pseudo-inverse of Jacobian $J_Q^\dagger = Q^{-1}J^T(JQ^{-1}J^T)^{-1}$:

$$(\ddot{x}+JM^{-1}g)^T J_Q^{\dagger T} Q J_Q^\dagger (\ddot{x}+JM^{-1}g) \leq 1 \quad (8)$$

This represents the modified dynamic manipulability ellipsoid for a redundant 2-link 4-DOF human arm in its 3-DOF task space. Any vector starting from the wrist and ending within the ellipsoid visualizes an acceleration (with magnitude and orientation) that the arm could achieve. As the ellipsoid center moves under loading conditions $\ddot{x}_g=-JM^{-1}g$, once large enough loads are applied to the arm the ellipsoid no longer encompasses the wrist. In this case, the wrist loses the ability to move in at least half of the directions, and the arm configuration is theoretically no longer stable.

FIG. 9 is a schematic diagram of a complete flowchart of the computer-implemented serial manipulator design method provided by one embodiment of the disclosure.

In the method according to embodiments above, the lengths of the links and the motor types of the motors of a manipulator are taken into consideration. The lengths of the links of the serial manipulator determine the weight of the links, and the motor types of the motors determine the weight of the motors. The motion profile that a designer hopes the serial manipulator to execute is discretized into multiple points. The dynamic manipulability ellipsoid at the end effector of the serial manipulator at each point is calculated, and the dynamic manipulability ellipsoid is visualized so that the designer can directly check whether the end effector is located in the dynamic manipulability ellipsoid. If the end effector is located in the dynamic manipulability ellipsoid, it means that the current design of the manipulator can withstand the current payload, and that the current lengths of the links and motor types of the motors are valid design parameters. If the end effector is not located in the dynamic manipulability ellipsoid, it means that the current design of the manipulator cannot withstand the current payload, and that the current lengths of the links and motor types of the motors need to be modified. The designer can input new values to the lengths of the links and motor types of the motors on the input interface of a computer. By visually viewing the dynamic manipulability ellipsoid on the display interface of the computer, and visually checking whether the end effector is located in the dynamic manipulability ellipsoid, the design process is simplified.

In the embodiments of the present disclosure, when designing a serial manipulator, it includes the process of dealing with external loads in different directions, instead of the traditional downward payload. When calculating the reachable task space of the serial manipulator, the weight of the links and the motors of the manipulator are used as the calculation parameters, which allow most of the kinematics and dynamics factors to be systematically considered. Considering the safety factors, the method can predict and avoid bottlenecks. The method has the potential to eliminate maintenance costs, and visualizes the motion profile of the end effector in task space, making it more intuitive and convenient for designers to modify design parameters. The trade-off design between high torque output and compact shape in the serial manipulator design process is optimized, which can reduce development costs, shorten development time, and improve design efficiency.

In one embodiment, a non-transitory computer-readable storage medium that may be configured in the computing device or the manipulator design device as described above. The non-transitory computer-readable storage medium may be the storage unit configured in the main control chip and the data acquisition chip in the foregoing embodiments. One or more computer programs are stored on the non-transitory computer-readable storage medium, and when the computer programs are executed by one or more processors, the manipulator design method described in the embodiments above is implemented.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the embodiments above, the description of each embodiment has its own emphasis. For parts that are not detailed or described in one embodiment, reference may be made to related descriptions of other embodiments.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those of ordinary skill in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be in the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer-readable medium may be appropriately increased or decreased according to the requirements of legislation and patent practice in the jurisdiction. For example, in some jurisdictions, according to the legislation and patent practice, a computer-readable medium does not include electric carrier signals and telecommunication signals. It should be noted that, the content included in the computer-readable medium could be appropriately increased and decreased according to requirements of legislation and patent practice under judicial jurisdictions. For example, in some judicial jurisdictions, the computer-readable medium does not include the electric carrier signal and the telecommunication signal according to the legislation and the patent practice.

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented design method of serial manipulator that comprises an end effector, a plurality of links, and a plurality of motors, the method comprising:
    providing a computing device comprising a display, an input device, a non-transitory computer-readable storage medium storing a solution pool, and a processor electrically coupled to the display, the input device, the non-transitory computer-readable storage medium, and the serial manipulator;
    obtaining, by the processor, a desired motion profile of the end effector;
    discretizing, by the processor, the desired motion profile into a plurality of points, wherein each of the points carries information of speed, acceleration, and force/torque of the end effector at the point;
    determining, by the processor, a number of degrees of freedom of the serial manipulator, and initializing a length of each of the links and a motor type of each of the motors;
    at each of the points, optimizing, by the processor, the initialized lengths of the links and the motor types of the motors by calculating a dynamic manipulability ellipsoid at the end effector, to obtain desired lengths of the links and desired motor types of the motors, which allows the end effector to execute the desired motion profile under predetermined constraints; and
    controlling, by the processor, the serial manipulator having the desired lengths of the links and the desired motor types of the motors to test the serial manipulator;
    wherein the constraints comprise: the desired motion profile has a preset smoothness; the serial manipulator needs to avoid obstacles; and positions of the end effector in the dynamic manipulability ellipsoid at each of the points are able to be connected to one another to form the desired motion profile;
    wherein optimizing, by the processor, the initialized lengths of the links and the motor types of the motors by calculating the dynamic manipulability ellipsoid at the end effector, to obtain the desired lengths of the links and the desired motor types of the motors, which allows the end effector to execute the desired motion profile under predetermined constraints, comprises:
    (a) determining, by the processor, an algorithm for calculating the dynamic manipulability ellipsoid at the end effector according to whether the serial manipulator is redundant in degrees of freedom, and calculating the dynamic manipulability ellipsoid at the end effector according to information of the speed, acceleration, and force/torque of the end effector at a current point;

(b) visualizing, by the processor, the dynamic manipulability ellipsoid, and displaying the visualized dynamic manipulability ellipsoid on the display;

(c) determining, by the processor, whether the end effector is outside the dynamic manipulability ellipsoid;

(d) saving, by the processor, configuration information of current lengths of the links and the motor types of the motors as configuration information of the serial manipulator in the solution pool, in response to the end effector being within the dynamic manipulability ellipsoid;

(e) obtaining, by the input device, lengths of the links and motor types of the motors inputted by the user, and modifying, by the processor, the current lengths of the links and the motor types of the motors based on the obtained lengths and the obtained motor types, in response to the end effector being outside the dynamic manipulability ellipsoid, and going back to (a);

wherein determining, by the processor, the algorithm for calculating the dynamic manipulability ellipsoid at the end effector according to whether the serial manipulator is redundant in degrees of freedom, comprises:

determining, by the processor, whether the degrees of freedom of the serial manipulator in a joint space are redundant with respect to the degrees of freedom in a task space;

in response to the degrees of freedom of the serial manipulator in the joint space being redundant with respect to the degrees of freedom in a task space, setting, by the processor, the speed and the acceleration at the current point to 0, and calculating the dynamic manipulability ellipsoid at the end effector using a Jacobian pseudo-inverse matrix according to the force/torque, the lengths of the links, and the motor types of the motors at the current point;

in response to the degrees of freedom of the serial manipulator in the joint space not being redundant with respect to the degrees of freedom in a task space, determining, by the processor, whether a target point is reachable in the task space;

in response to the target point not being reachable in the task space, modifying, by the processor, the current lengths of the links and the motor types of the motors;

in response to the target point being reachable in the task space, setting, by the processor, the speed and the acceleration at the current point to 0, and calculating the dynamic manipulability ellipsoid at the end effector using a Jacobian inverse matrix according to the force/torque, the lengths of the links, and the motor types of the motors at the current point.

2. The method of claim 1, further comprising, after saving, by the processor, the configuration information of current lengths of the links and the motor types of the motors, obtaining, by the processor, information of speed, acceleration, and force/torque of the end effector at a next point based on the configuration information of current lengths of the links and the motor types of the motors, and going back to (a).

3. The method of claim 2, wherein discretizing, by the processor, the desired motion profile into the plurality of points comprises:

dividing, by the processor, the desired motion profile equally into a plurality of points, or discretizing the desired motion profile into a plurality of points by a multi-order polynomial approximation method.

4. The method of claim 3, wherein the number of the degrees of freedom lies in a range of 5 to 7.

5. The method of claim 1, further comprising:

receiving, by the input device, initialized values of the length of each of the links and the motor type of each of the motors inputted by the user.

6. A device for designing a serial manipulator that comprises an end effector, a plurality of links, and a plurality of motors, the device comprising:

one or more processors;

a display;

an input device;

a non-transitory memory storing a the solution pool; and one or more programs, wherein the one or more programs are stored in the non-transitory memory and configured to be executed by the one or more processors, the one or more programs comprise:

instructions for obtaining a desired motion profile of the end effector;

instructions for discretizing the desired motion profile into a plurality of points, wherein each of the points carries information of speed, acceleration, and force/torque of the end effector at the point;

instructions for determining a number of degrees of freedom of the serial manipulator, and initializing a length of each of the links and a motor type of each of the motors;

instructions for, at each of the points, optimizing the initialized lengths of the links and the motor types of the motors by calculating a dynamic manipulability ellipsoid at the end effector, to obtain desired lengths of the links and desired motor types of the motors, which allows the end effector to execute the desired motion profile under predetermined constraints; and instructions for, controlling the serial manipulator having the desired lengths of the links and the desired motor types of the motors to test the serial manipulator;

wherein the constraints comprise: the desired motion profile has a preset smoothness; the serial manipulator needs to avoid obstacles; and positions of the end effector in the dynamic manipulability ellipsoid at each of the points are able to be connected to one another to form the desired motion profile, wherein the instructions for optimizing the initialized lengths of the links and the motor types of the motors by calculating the dynamic manipulability ellipsoid at the end effector, to obtain the desired lengths of the links and the desired motor types of the motors, which allows the end effector to execute the desired motion profile under predetermined constraints, comprise:

(a) instructions for determining an algorithm for calculating the dynamic manipulability ellipsoid at the end effector according to whether the serial manipulator is redundant in degrees of freedom, and calculating the dynamic manipulability ellipsoid at the end effector according to information of the speed, acceleration, and force/torque of the end effector at a current point;

(b) instructions for visualizing the dynamic manipulability ellipsoid, and displaying the visualized dynamic manipulability ellipsoid on the display;

(c) instructions for determining whether the end effector is outside the dynamic manipulability ellipsoid;

(d) instructions for saving configuration information of current lengths of the links and the motor types of the motors as configuration information of the serial manipulator in the solution pool, in response to the end effector being within the dynamic manipulability ellipsoid;

(e) instructions for obtaining, by the input device, lengths of the links and motor types of the motors inputted by the user, and modifying the current lengths of the links and the motor types of the motors based on the obtained lengths and the obtained motor types, in response to the end effector being outside the dynamic manipulability ellipsoid, and going back to a);

wherein the instructions for determining the algorithm for calculating the dynamic manipulability ellipsoid at the end etlecctor according to whether the serial manipulator is redundant in degrees of freedom, comprise:

instructions for determining whether the degrees of freedom of the serial manipulator in a joint space are redundant with respect to the degrees of freedom in a task space;

instructions for, in response to the degrees of freedom of the serial manipulator in the joint space being redundant with respect to the degrees of freedom in a task space, setting the speed and the acceleration at the current point to 0, and calculating the dynamic manipulability ellipsoid at the end effector using a Jacobian pseudo-inverse matrix according to the force/torque, the lengths of the links, and the motor types of the motors at the current point;

instructions for, in response to the degrees of freedom of the serial manipulator in the joint space not being redundant with respect to the degrees of freedom in a task space, determining whether a target point is reachable in the task space;

instructions for, in response to the target point not being reachable in the task space, modifying the current lengths of the links and the motor types of the motors;

instructions for, in response to the target point being reachable in the task space, setting the speed and the acceleration at the current point to 0, and calculating the dynamic manipulability ellipsoid at the end effector using a Jacobian inverse matrix according to the force/torque, the lengths of the links, and the motor types of the motors at the current point.

7. The device of claim 6, wherein the one or more programs further comprise, after saving configuration information of current lengths of the links and the motor types of the motors, instructions for obtaining information of speed, acceleration, and force/torque of the end effector at a next point based on the configuration information of current lengths of the links and the motor types of the motors, and going back to (a).

8. The device of claim 7, wherein the instructions for discretizing the desired motion profile into the plurality of points comprise:

instructions for dividing the desired motion profile equally into a plurality of points, or instructions for discretizing the desired motion profile into a plurality of points by a multi-order polynomial approximation method.

9. The device of claim 8, wherein the number of the degrees of freedom lies in a range of 5 to 7.

10. The device of claim 6, wherein the device is wiredly or wirelessly connected to the serial manipulator.

11. The device of claim 6, wherein the constraints further comprises a weight of the links and a weight of the motors of the serial manipulator.

12. The device of claim 6, wherein the one or more programs comprise:

instructions for receiving, by the input device, initialized values of the length of each of the links and the motor type of each of the motors inputted by the user.

13. A non-transitory computer-readable storage medium storing a solution pool and one or more programs to be executed by a device for designing a serial manipulator that comprises an end effector, a plurality of links, and a plurality of motors, the one or more programs, when being executed by one or more processors of the device, causes the device to perform processing comprising:

obtaining a desired motion profile of the end effector;

discretizing the desired motion profile into a plurality of points, wherein each of the points carries information of speed, acceleration, and force/torque of the end effector at the point;

determining a number of degrees of freedom of the serial manipulator, and initializing a length of each of the links and a motor type of each of the motors;

at each of the points, optimizing the initialized lengths of the links and the motor types of the motors by calculating a dynamic manipulability ellipsoid at the end effector, to obtain desired lengths of the links and desired motor types of the motors, which allows the end effector to execute the desired motion profile under predetermined constraints; and controlling the serial manipulator having the desired lengths of the links and the desired motor types of the motors to test the serial manipulator;

wherein the constraints comprise: the desired motion profile has a preset smoothness; the serial manipulator needs to avoid obstacles; and positions of the end effector in the dynamic manipulability ellipsoid at each of the points are able to be connected to one another to form the desired motion profile;

wherein optimizing the initialized lengths of the links and the motor types of the motors by calculating the dynamic manipulability ellipsoid at the end effector, to obtain the desired lengths of the links and the desired motor types of the motors, which allows the end effector to execute the desired motion profile under predetermined constraints, comprises:

(a) determining an algorithm for calculating the dynamic manipulability ellipsoid at the end effector according to whether the serial manipulator is redundant in degrees of freedom, and calculating the dynamic manipulability ellipsoid at the end effector according to information of the speed, acceleration, and force/torque of the end effector at a current point;

(b) visualizing the dynamic manipulability ellipsoid, and displaying the visualized dynamic manipulability ellipsoid on a display;

(c) determining whether the end effector is outside the dynamic manipulability ellipsoid;

(d) saving configuration information of current lengths of the links and the motor types of the motors as configuration information of the serial manipulator in the solution pool, in response to the end effector being within the dynamic manipulability ellipsoid;

(e) obtaining, by an input device, lengths of the links and motor types of the motors inputted by the user, and modifying the current lengths of the links and the motor types of the motors based on the obtained lengths and the obtained motor types, in response to the end effector being outside the dynamic manipulability ellipsoid, and going back to (a);

wherein determining the algorithm for calculating the dynamic manipulability ellipsoid at the end effector according to whether the serial manipulator is redundant in degrees of freedom, comprises:

determining whether the degrees of freedom of the serial manipulator in a joint space are redundant with respect to the degrees of freedom in a task space;

in response to the degrees of freedom of the serial manipulator in the joint space being redundant with respect to the degrees of freedom in a task space, setting the speed and the acceleration at the current point to 0, and calculating the dynamic manipulability ellipsoid at the end effector using a Jacobian pseudo-inverse matrix according to the force/torque, the lengths of the links, and the motor types of the motors at the current point;

in response to the degrees of freedom of the serial manipulator in the joint space not being redundant with respect to the degrees of freedom in a task space, determining whether a target point is reachable in the task space;

in response to the target point not being reachable in the task space, modifying the current lengths of the links and the motor types of the motors;

in response to the target point being reachable in the task space, setting the speed and the acceleration at the current point to 0, and calculating the dynamic manipulability ellipsoid at the end effector using a Jacobian inverse matrix according to the force/torque, the lengths of the links, and the motor types of the motors at the current point.

14. The non-transitory computer-readable storage medium of claim 13, further comprising, after saving configuration information of current lengths of the links and the motor types of the motors, obtaining information of speed, acceleration, and force/torque of the end effector at a next point based on the configuration information of current lengths of the links and the motor types of the motors, and going back to (a).

15. The non-transitory computer-readable storage medium of claim 14, wherein discretizing the desired motion profile into the plurality of points comprises:

dividing the desired motion profile equally into a plurality of points, or discretizing the desired motion profile into a plurality of points by a multi-order polynomial approximation method.

16. The non-transitory computer-readable storage medium of claim 15, wherein the number of the degrees of freedom lies in a range of 5 to 7.

17. The non-transitory computer-readable storage medium of claim 13, wherein the desired motion profile contains force/torque information.

18. The non-transitory computer-readable storage medium of claim 13, wherein a distance between two adjacent points is set to 3 millimeters.

19. The non-transitory computer-readable storage medium of claim 13, wherein the constraints further comprises a weight of the links and a weight of the motors of the serial manipulator.

20. The non-transitory computer-readable storage medium of claim 13, wherein the processing further comprises:

receiving, by the input device, initialized values of the length of each of the links and the motor type of each of the motors inputted by the user.

* * * * *